United States Patent
Gauthier et al.

(10) Patent No.: US 11,021,073 B1
(45) Date of Patent: Jun. 1, 2021

(54) ELECTRIC VEHICLE POWER SUPPLY SYSTEM TO MINIMIZE LOSS DURING VEHICLE REST

(71) Applicant: Atieva, Inc., Newark, CA (US)

(72) Inventors: Jean-Philippe Gauthier, San Francisco, CA (US); Matthew Djock, Fremont, CA (US); Richard Biskup, Sunnyvale, CA (US)

(73) Assignee: Atieva, Inc., Redwood City, CA (US)

( * ) Notice: Subject to any disclaimer, the term of this patent is extended or adjusted under 35 U.S.C. 154(b) by 0 days.

(21) Appl. No.: 16/801,702

(22) Filed: Feb. 26, 2020

(51) Int. Cl.
*B60L 53/22* (2019.01)
*B60L 50/60* (2019.01)
*H02M 3/00* (2006.01)

(52) U.S. Cl.
CPC ........... *B60L 53/22* (2019.02); *B60L 50/66* (2019.02); *H02M 3/00* (2013.01); *B60L 2210/10* (2013.01)

(58) Field of Classification Search
CPC ...... B60L 53/22; B60L 50/66; B60L 2210/10; H02M 3/00
See application file for complete search history.

(56) References Cited

U.S. PATENT DOCUMENTS

| | | | |
|---|---|---|---|
| 2011/0187184 A1* | 8/2011 | Ichikawa | B60L 8/003 307/10.1 |
| 2015/0097527 A1* | 4/2015 | DeDona | B60L 58/20 320/109 |
| 2019/0299807 A1* | 10/2019 | Oyama | B60L 58/13 |
| 2020/0023795 A1* | 1/2020 | Hirashima | H02J 7/00 |
| 2020/0195020 A1* | 6/2020 | Tanaka | H02J 7/1423 |

OTHER PUBLICATIONS

International Search Report and Written Opinion for PCT Application No. PCT/US2021/070182, dated Apr. 1, 2021, 6 pages.

* cited by examiner

*Primary Examiner* — Jared Fureman
*Assistant Examiner* — Duc M Pham
(74) *Attorney, Agent, or Firm* — Brake Hughes Bellermann LLP

(57) ABSTRACT

A power management system for an electric vehicle is provided which maintains power to the various vehicle 'always-on' components and subsystems during periods of vehicle non-use without requiring the low voltage battery to undergo frequent charge/discharge cycling. The system uses a secondary DC/DC converter that has a lower output voltage, and operates at a higher efficiency, then the primary DC/DC converter. As a result of this system, the life of the low voltage battery is prolonged and power consumption efficiency is improved, thereby minimizing range loss while the car is parked.

11 Claims, 2 Drawing Sheets

ELECTRIC VEHICLE POWER SUPPLY SYSTEM TO MINIMIZE LOSS DURING VEHICLE REST

FIELD OF THE INVENTION

The present invention relates generally to an electric vehicle and, more particularly, to a system that optimizes delivery of power to electric vehicle systems while the car is at rest.

BACKGROUND OF THE INVENTION

In response to the demands of consumers who are driven both by ever-escalating fuel prices and the dire consequences of global warming, the automobile industry is slowly starting to embrace the need for ultra-low emission, high efficiency cars. While some within the industry are attempting to achieve these goals by engineering more efficient internal combustion engines, others are incorporating hybrid or all-electric drive trains into their vehicle line-ups. All-electric drive trains offer multiple advantages, including eliminating the primary source of vehicle pollution while significantly reducing drive train complexity.

Irrespective of whether an electric vehicle (EV) uses a hybrid or an all-electric drive train, the battery pack employed in such a car represents a significant cost in the overall vehicle's cost. In addition to cost, the vehicle's design team and manufacturer must take a variety of factors into account including overall vehicle weight, weight distribution, battery pack package size, and the desired performance and driving range for the vehicle.

In general all cars, regardless of whether the car utilizes an internal combustion engine (ICE), a hybrid power train, or an all-electric power train, include a number of 'always-on' components and systems. These components and systems are directly connected to the vehicle's power supply and therefore are always in a powered-up state. Examples of such components and systems may include power door locks, power windows, power seats, internal and external lights, alarm systems, entertainment systems (e.g., radio, clock, etc.), HVAC fans, GPS location services, and a variety of monitoring systems that may be used to monitor vehicle and/or battery health (e.g., battery pack temperature, battery pack discharge, etc.). While the power drain on the battery may be small, especially given the size of a typical EV or hybrid battery pack, such a drain can have unintended consequences if allowed to continue over a long period of time, for example when the user is on vacation and places the car in storage. Accordingly, what is needed is a battery management system that is able to minimize the effects of 'always-on' vehicle components and systems without limiting their use. The present invention provides such a system.

SUMMARY OF THE INVENTION

The present invention provides an electric vehicle (EV) power management system that includes (i) a high voltage (HV) battery; (ii) a primary DC/DC converter; (iii) a vehicle power switch adjustable between an on position and an off position, where the primary DC/DC converter is electrically connected to the HV battery when the vehicle power switch is in the on position, where the primary DC/DC converter provides a first power source of a first voltage on a first power line when the vehicle power switch is in the on position, where the primary DC/DC converter is electrically disconnected from the HV battery when the vehicle power switch is in the off position, and where the primary DC/DC converter ceases to provide the first power source on the first power line when the vehicle power switch is in the off position; (iv) a secondary DC/DC converter, where the secondary DC/DC converter is electrically connected to the HV battery and remains electrically connected to the HV battery both when the vehicle power switch is in the on position and when the vehicle power switch is in the off position, where the secondary DC/DC converter provides a second power source of a second voltage on a second power line, and where the second voltage is lower than the first voltage; (v) an electronic control unit (ECU), where the ECU is electrically connected to at least one EV electrical component; and (vi) a switching circuit electrically connected to the ECU and configured to select between electrically connecting the first power line to the ECU and electrically connecting the second power line to the ECU, where the switching circuit electrically connects the first power line to the ECU when the first voltage on the first power line is greater than the second voltage on the second power line, and where the switching circuit electrically connects the second power line to the ECU when the second voltage is greater than a voltage on the first power line. The switching circuit selects between the first and second power lines based on voltage levels. The EV electrical component connected to the ECU is preferably selected from the group consisting of a power door lock, a power window, a power seat, an internal light, an external light, a vehicle alarm system, a vehicle entertainment system, a HVAC fan, a GPS system, an airbag system, a seatbelt pre-tensioner, an ABS system, a brake booster vacuum pump, a steering assist system, and a vehicle monitoring system. Preferably the vehicle power switch determines the vehicle's operational status. Additionally, in at least one embodiment the second power source provided by the secondary DC/DC converter is sized to be able to close the HV battery contactors.

The EV power management system may include a secondary battery electrically connected to the first power line, where the resting voltage of the secondary battery is less than the first voltage, and where the resting voltage of the secondary battery is less than the second voltage. The switching circuit may be configured to electrically connect the second power line to the ECU when the second voltage on the second power line is greater than the voltage on the first power line. The switching circuit may be configured to electrically connect the first power line to the ECU when the resting voltage of the secondary battery on the first power line is greater than the output of the first power source provided by the primary DC/DC converter and the resting voltage of the secondary battery on the first power line is greater than the output of the second power source provided by the secondary DC/DC converter. The switching circuit may be configured to electrically connect the first power line to the ECU when the vehicle power switch is in the off position and a malfunction in the secondary DC/DC converter causes the secondary DC/DC converter to output a voltage less than the resting voltage of the secondary battery. The switching circuit may be configured to electrically connect the first power line to the ECU when a malfunction in the primary DC/DC converter causes the primary DC/DC converter to output a voltage less than the resting voltage of the secondary battery and a malfunction in the secondary DC/DC converter causes the secondary DC/DC converter to output a voltage less than the resting voltage of the secondary battery. Preferably the first power source charges the secondary battery when the vehicle power switch is in the on position and the primary DC/DC converter provides the first power source on the first power line.

A further understanding of the nature and advantages of the present invention may be realized by reference to the remaining portions of the specification and the drawings.

BRIEF DESCRIPTION OF THE DRAWINGS

It should be understood that the accompanying figures are only meant to illustrate, not limit, the scope of the invention and should not be considered to be to scale. Additionally, use of the same reference label on multiple figures should be understood to refer to the same component or a component of similar functionality.

DESCRIPTION OF THE SPECIFIC EMBODIMENTS

Figure 1:
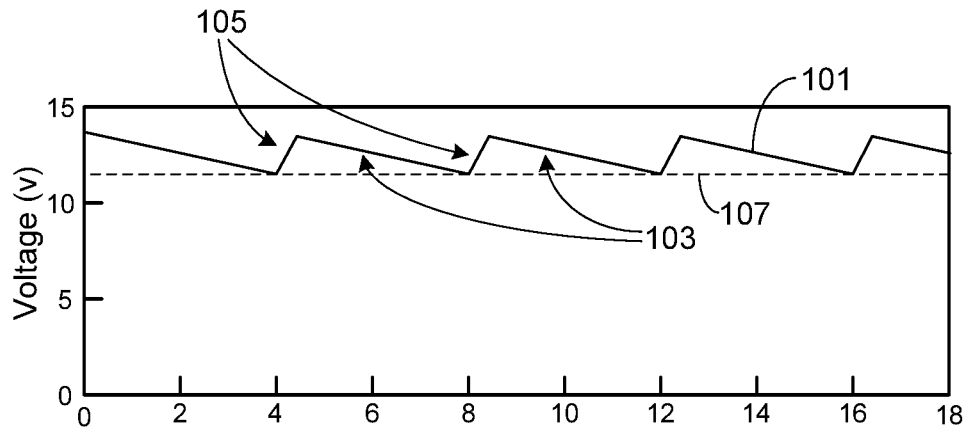
FIG. 1 graphically illustrates the cycling process of the secondary battery in a conventional EV.

As used herein, the singular forms "a", "an" and "the" are intended to include the plural forms as well, unless the context clearly indicates otherwise. The terms "comprises", "comprising", "includes", and/or "including", as used herein, specify the presence of stated features, integers, steps, operations, elements, and/or components, but do not preclude the presence or addition of one or more other features, integers, steps, operations, elements, components, and/or groups thereof. As used herein, the term "and/or" and the symbol "/" are meant to include any and all combinations of one or more of the associated listed items. Additionally, while the terms first, second, etc. may be used herein to describe various steps or calculations, these steps or calculations should not be limited by these terms, rather these terms are only used to distinguish one step or calculation from another. For example, a first calculation could be termed a second calculation; similarly a first step could be termed a second step; similarly a first component could be termed a second component, all without departing from the scope of this disclosure. The term "battery pack" as used herein refers to one or more batteries electrically interconnected to achieve the desired voltage and capacity. The terms "electric vehicle" and "EV" may be used interchangeably.

In a typical EV, in addition to the high voltage (HV) battery pack that provides power to the drive train, a secondary battery is used to ensure that power is maintained for 'always-on' components and subsystems. This type of component and subsystem may include both convenience and critical components and subsystems. Typical convenience components and subsystems include those car features that are preferably available even when the vehicle is not running, examples of which may include power door locks, power windows, power seats, internal and external lights, alarm systems, entertainment systems (e.g., radio, clock, etc.), HVAC fans, GPS location services, and a variety of monitoring systems that may be used to monitor vehicle and/or battery health. Critical components and subsystems include those car features that should always be operational, even if the HV system encounters a failure such as a cell/battery pack failure or some other event that causes the HV battery to become non-operational. Examples of critical components and subsystems include emergency lighting, airbags, seatbelt pre-tensioners, the ABS system, the brake booster vacuum pump and monitoring systems that monitor critical vehicle functions (e.g., battery pack catastrophic failure).

In a conventional EV, the secondary battery is a standard 12VDC battery, similar if not identical to the battery used in conventional non-EV vehicles. When the secondary battery is drained to a level lower than a preset level, the primary HV battery is used to charge the secondary battery using the vehicle's DC to DC converter. If the car is driven frequently with relatively short breaks in-between drives, for example over-night parking only, the charge level in the secondary battery is sufficient to provide power to the always-on components and subsystem. However if the load on the secondary battery increases sufficiently, for example due to the inclusion of features such as remote mobile access to the on-board systems and/or an on-board vehicle monitoring and alarm system that includes video cameras and recording capabilities, the secondary battery may be insufficient to provide power for very long without being recharged by the DC/DC converter. Furthermore even with a relatively limited number of auxiliary always-on components and subsystems, the secondary battery may have insufficient charge to provide power for extended periods (e.g., over a weekend or during a vacation period).

When a conventional EV is parked and in the off mode, and once the secondary battery exhibits a charge level below a preset level, the vehicle's control system wakes up the primary power system and uses the HV battery and the DC/DC converter to charge the secondary battery. If the load on the secondary battery due to the always-on components and subsystems is sufficiently large, or if the vehicle has been in this mode for an extended period of time, the system may cycle repeatedly through the charge/discharge/charge cycle. FIG. 1 graphically illustrates this cycling process. Line 101 represents the battery voltage over time, with downward sloping regions 103 representing the periods of slow battery discharge and upward sloping regions 105 representing the periods in which the secondary battery is charged by the primary battery and the DC-DC converter. Line 107 represents the minimum allowed voltage for the secondary battery, and thus the point at which a charging cycle is initiated.

Subjecting the secondary battery to a frequent cycle of discharging and charging when the car is not in use as illustrated in FIG. 1 creates two problems. First, it dramatically shortens the life span of the secondary battery, often from an expected life span of 6 or more years to a life span of 1-2 years. Second, given that this cycling process is inherently lossy with an efficiency of approximately 50%, its use depletes the primary battery pack more than warranted which, in turn, unnecessarily decreases vehicle range.

Figure 2:
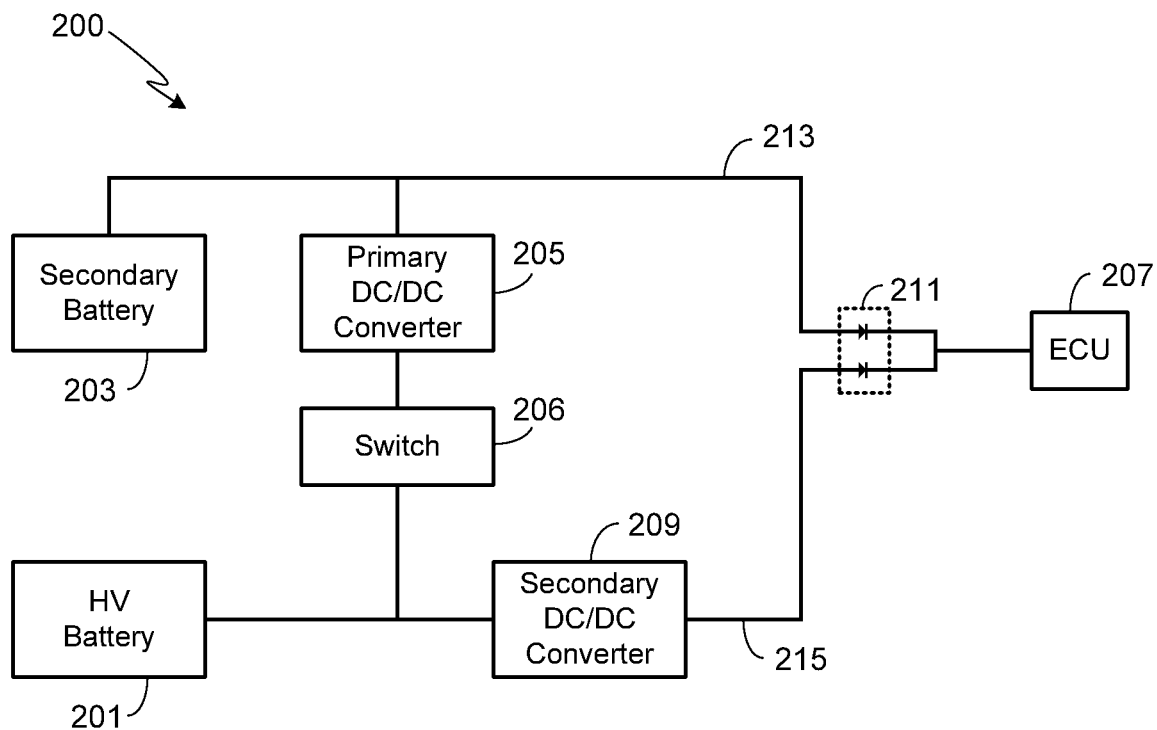
FIG. 2 provides a simplified schematic of an exemplary power management system that utilizes both primary and secondary DC/DC converters.

The present invention overcomes the effects of frequent discharge/charge cycling by integrating a secondary DC/DC converter into the EV's power management system. A simplified schematic of an exemplary power management system 200 is shown in FIG. 2. As shown, power management system 200 includes both a primary HV battery 201 and a secondary low voltage battery 203. Typically battery 203 is a 12VDC battery, similar or identical to a conventional car battery. A primary DC/DC converter 205, which performs the same or similar functions to the DC/DC converter in a conventional EV, converts the output from HV battery 201 to a voltage suitable for the various vehicle systems, including the traction motor controller (not shown).

A switch 206 determines whether or not primary DC/DC converter 205 is electrically connected to HV battery 201. Switch 206 is the same as, or directly linked to, the power switch that determines the operational status of the vehicle, i.e., whether the vehicle is currently 'on' or 'off'. Switch 206 may be controlled by any of a variety of techniques, for example by turning a key to the 'on' or 'off' position; alternately, pressing an 'on' button that is located on the dash, center console, or elsewhere; alternately, using a key fob, etc.

In at least one embodiment of the invention, the output of HV battery 201 is approximately 950VDC, the output of secondary battery 203 is approximately 12VDC (resting voltage of approximately 12.7VDC), and the output from DC/DC converter 205 is approximately 14.4VDC. As such, during normal operation of the EV, i.e., when switch 206 is in the 'on' position, HV battery 201 provides power to the always-on vehicle systems via DC/DC converter 205 and electronic control unit (ECU) 207. ECU 207 selectively provides power to the components and systems, not shown, coupled to the ECU. It should be understood that ECU 207 may be comprised of multiple ECUs, each of which is individually connected to the power management system, or a single ECU that selectively provides power to various vehicle systems. In addition to providing power to the vehicle systems via ECU 207, DC/DC converter 205 charges and maintains the charge level in secondary battery 203. As in a conventional EV, secondary battery 203 ensures that power is available to those components and subsystems connected to ECU 207 even if there is a failure in DC/DC converter 205 or in the primary battery source, i.e., HV battery 201. While this form of battery redundancy is not strictly necessary for convenience-type always-on car features, it is preferable for some critical vehicle systems such as the brake and steering assist systems as well as critical safety systems such as the airbags and the seat-belt tensioners.

In accordance with the invention, power management system 200 includes a second DC/DC converter 209. Secondary DC/DC converter 209 is more efficient than primary DC/DC converter 205 and outputs a voltage level lower than that of primary DC/DC converter 205 and higher than that of secondary battery 203, preferably outputting a voltage of approximately 13.5VDC. As shown, a switching circuit 211, preferably comprised of a simple diode circuit, determines which source is coupled to ECU 207 by selecting the source providing the highest voltage. Accordingly, when the car is in the 'on' mode (i.e., switch 206 in the 'on' position allowing normal vehicle operation with power being supplied to primary DC/DC converter 205), switching circuit 211 couples ECU 207 to HV battery 201 via primary DC/DC converter 205 (i.e., power line 213). When the car is in the 'off' or resting mode (i.e., switch 206 in the 'off' position and primary DC/DC converter 205 not coupled to HV battery 201), primary DC/DC converter 205 no longer provides power to line 213. As a result, the voltage on line 213 drops to that of secondary battery 203 causing switching circuit 211 to couple ECU 207 to the primary battery pack 201 via secondary DC/DC converter 209. It will be appreciated that in this embodiment if secondary DC/DC converter fails and there is a catastrophic failure in either secondary DC/DC converter 209 or HV battery pack 203, then secondary battery 203 maintains power to ECU 207, thereby ensuring that power is maintained in those components and subsystems connected to ECU 207 (e.g., critical components and subsystems).

In the preferred embodiment secondary DC/DC converter provides a constant 13.5VDC for up to 3-5 amps. Given the much higher efficiency of secondary DC/DC converter 209 as compared to converter 205, the power drain on HV battery 201 is much less than that associated with the charge/discharge cycling approach employed in a conventional EV. By reducing power drain on HV battery 201, the EV's range, which is based on the power available from battery 201, is affected to a lesser extent than that resulting from the conventional cycling approach. Additionally, by significantly reducing charge/discharge cycling of battery 203, its life is not shortened as it is in the conventional approach.

In a conventional EV, the secondary battery (i.e., the 12VDC battery) is used to close the contactors on the HV battery. As a result of this approach, if the secondary battery is totally discharged, which is more likely to occur during long periods of rest when the secondary battery is undergoing the charge/discharge cycle described above, an EV may be unable to start. Accordingly, an additional benefit of the system shown in FIG. 2 is that the HV battery 201 can be used to close the contactors on the HV battery by using power supplied via secondary DC/DC converter 209 on power line 215, assuming that secondary DC/DC converter is sized to be able to provide the power necessary to close the contactors.

Figure 3:
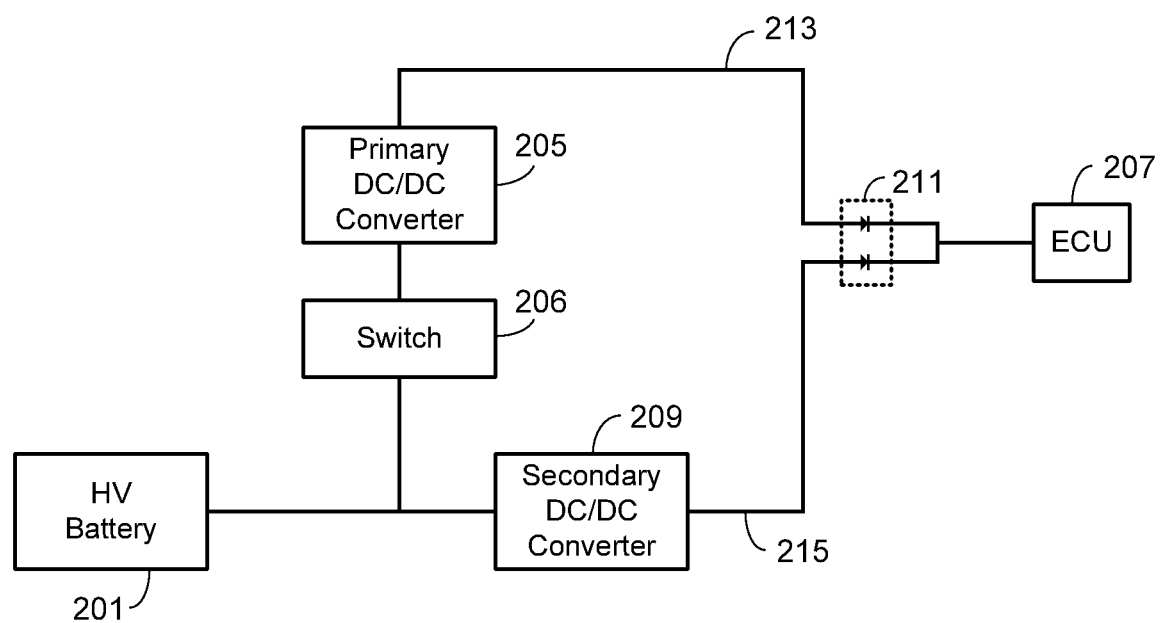
FIG. 3 provides a simplified schematic of an exemplary power management system that utilizes both primary and secondary DC/DC converters and a single battery source.

As noted above, in the preferred embodiment of the invention, a secondary battery 203 is included in the power system to ensure that power is available to at least the critical vehicle subsystems if there is a catastrophic failure with either the primary HV battery 201 or the primary DC/DC converter 205. It should be understood, however, that due to the use of secondary DC/DC converter 209, a secondary battery is not required for operation of the EV power systems, including the always-on systems. FIG. 3 illustrates this configuration. As shown, when the car is in the 'on' mode, power to ECU 207 is from the primary DC/DC converter 205 via line 213. When the car is in the 'off' mode (i.e., the resting mode), switching circuit 211 connects ECU 207 to the HV battery via the smaller, secondary DC/DC converter 209 via line 215.

Systems and methods have been described in general terms as an aid to understanding details of the invention. In some instances, well-known structures, materials, and/or operations have not been specifically shown or described in detail to avoid obscuring aspects of the invention. In other instances, specific details have been given in order to provide a thorough understanding of the invention. One skilled in the relevant art will recognize that the invention may be embodied in other specific forms, for example to adapt to a particular system or apparatus or situation or material or component, without departing from the spirit or essential characteristics thereof. Therefore the disclosures and descriptions herein are intended to be illustrative, but not limiting, of the scope of the invention.

What is claimed is:

1. An electric vehicle (EV) power management system, comprising:
   a high voltage (HV) battery;
   a primary DC/DC converter;
   a vehicle power switch adjustable between an on position and an off position, wherein said primary DC/DC converter is electrically connected to said HV battery when said vehicle power switch is in said on position, wherein said primary DC/DC converter provides a first power source of a first voltage on a first power line when said vehicle power switch is in said on position, wherein said primary DC/DC converter is electrically disconnected from said HV battery when said vehicle power switch is in said off position, and wherein said primary DC/DC converter ceases to provide said first power source on said first power line when said vehicle power switch is in said off position;

a secondary DC/DC converter, wherein said secondary DC/DC converter is electrically connected to said HV battery and remains electrically connected to said HV battery both when said vehicle power switch is in said on position and when said vehicle power switch is in said off position, wherein said secondary DC/DC converter provides a second power source of a second voltage on a second power line, and wherein said second voltage is lower than said first voltage;

an electronic control unit (ECU), wherein said ECU is electrically connected to at least one EV electrical component; and a switching circuit electrically connected to said ECU and configured to select between electrically connecting said first power line to said ECU and electrically connecting said second power line to said ECU, wherein said switching circuit electrically connects said first power line to said ECU when said first voltage on said first power line is greater than said second voltage on said second power line, and wherein said switching circuit electrically connects said second power line to said ECU when said second voltage is greater than a voltage on said first power line.

2. The EV power management system of claim 1, wherein said switching circuit selects between said first power line and said second power line based on voltage levels.

3. The EV power management system of claim 2, further comprising a secondary battery electrically connected to said first power line, wherein a resting voltage of said secondary battery is less than said first voltage, and wherein said resting voltage of said secondary battery is less than said second voltage.

4. The EV power management system of claim 3, wherein said switching circuit electrically connects said second power line to said ECU when said second voltage on said second power line is greater than said voltage on said first power line.

5. The EV power management system of claim 3, wherein said switching circuit electrically connects said first power line to said ECU when said resting voltage of said secondary battery on said first power line is greater than an output of said first power source provided by said primary DC/DC converter and said resting voltage of said secondary battery on said first power line is greater than an output of said second power source provided by said secondary DC/DC converter.

6. The EV power management system of claim 3, wherein said switching circuit electrically connects said first power line to said ECU when said vehicle power switch is in said off position and a malfunction in said secondary DC/DC converter causes said secondary DC/DC converter to output a voltage less than said resting voltage of said secondary battery.

7. The EV power management system of claim 3, wherein said switching circuit electrically connects said first power line to said ECU when a malfunction in said primary DC/DC converter causes said primary DC/DC converter to output a voltage less than said resting voltage of said secondary battery and a malfunction in said secondary DC/DC converter causes said secondary DC/DC converter to output a voltage less than said resting voltage of said secondary battery.

8. The EV power management system of claim 3, wherein said first power source charges said secondary battery when said vehicle power switch is in said on position and said primary DC/DC converter provides said first power source on said first power line.

9. The EV power management system of claim 2, said at least one EV electrical component selected from the group consisting of a power door lock, a power window, a power seat, an internal light, an external light, a vehicle alarm system, a vehicle entertainment system, a HVAC fan, a GPS system, an airbag system, a seatbelt pre-tensioner, an ABS system, a brake booster vacuum pump, a steering assist system, and a vehicle monitoring system.

10. The EV power management system of claim 2, wherein said vehicle power switch determines a vehicle operational status.

11. The EV power management system of claim 2, wherein said second power source provided by said secondary DC/DC converter is capable of closing a set of HV battery contactors.

* * * * *